(12) United States Patent
Zell et al.

(10) Patent No.: US 9,194,314 B2
(45) Date of Patent: Nov. 24, 2015

(54) METHOD AND DEVICE FOR CONTROLLING AN INTERNAL COMBUSTION ENGINE

(75) Inventors: Helmut Zell, Bad Buchau (DE); Andreas Pape, Oberriexingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1206 days.

(21) Appl. No.: 12/733,349

(22) PCT Filed: Sep. 9, 2008

(86) PCT No.: PCT/EP2008/061912
§ 371 (c)(1),
(2), (4) Date: Jun. 29, 2010

(87) PCT Pub. No.: WO2009/037150
PCT Pub. Date: Mar. 26, 2009

(65) Prior Publication Data
US 2010/0263730 A1 Oct. 21, 2010

(30) Foreign Application Priority Data

Sep. 14, 2007 (DE) .......................... 10 2007 043 908

(51) Int. Cl.
| F02D 41/06 | (2006.01) |
| F02D 41/00 | (2006.01) |
| F02D 41/04 | (2006.01) |
| F02M 25/08 | (2006.01) |
| F02N 11/08 | (2006.01) |

(52) U.S. Cl.
CPC ............ *F02D 41/003* (2013.01); *F02D 41/042* (2013.01); *F02M 25/0827* (2013.01); *F02N 11/0825* (2013.01); *Y02T 10/48* (2013.01); *Y10T 137/0318* (2015.04); *Y10T 137/9247* (2015.04)

(58) Field of Classification Search
CPC  F02D 41/003; F02D 41/042; F02M 25/0827; F02N 11/0825; Y10T 137/9247; Y10T 137/0318
USPC ........................................ 123/179.4; 701/112
See application file for complete search history.

(56) References Cited

U.S. PATENT DOCUMENTS

| 4,466,392 | A * | 8/1984 | Uchida et al. ............... 123/179.4 |
| 5,371,412 | A * | 12/1994 | Iwashita et al. ............... 290/1 R |
| 6,640,620 | B2 * | 11/2003 | Cook et al. .................. 73/114.39 |
| 6,664,651 | B1 | 12/2003 | Breida et al. |
| 6,679,214 | B2 * | 1/2004 | Kobayashi et al. ........ 123/179.4 |
| 6,789,523 | B2 * | 9/2004 | Oki et al. .................. 123/198 D |
| 6,854,323 | B2 * | 2/2005 | Wiltsch ....................... 73/114.43 |
| 6,935,317 | B2 * | 8/2005 | Wiesenberger et al. ....... 123/519 |
| 7,610,143 | B1 * | 10/2009 | Boesch .......................... 701/112 |
| 2002/0139173 | A1 * | 10/2002 | Kano et al. ..................... 73/49.7 |
| 2014/0236458 | A1 * | 8/2014 | Guo et al. ..................... 701/112 |

FOREIGN PATENT DOCUMENTS

| DE | 32 27 289 | 2/1983 |
| DE | 102 01 889 | 8/2002 |
| DE | 103 31 240 | 2/2005 |
| DE | 10 2005 037 466 | 2/2007 |
| EP | 1 279 815 | 1/2003 |
| JP | 2002-213268 | 7/2002 |
| JP | 2004-197589 | 7/2004 |
| WO | WO 2007/017323 | 2/2007 |

* cited by examiner

*Primary Examiner* — Hieu T Vo
*Assistant Examiner* — Sherman Manley
(74) *Attorney, Agent, or Firm* — Kenyon & Kenyon LLP

(57) ABSTRACT

A method and a device for controlling a fuel-operated internal combustion engine of a motor vehicle having a tank venting system associated with a fuel tank and having at least two operating states, in which the internal combustion engine is shut off automatically according to a shut-off strategy. The shut-off strategy takes into account the instantaneous operating state of the tank venting system.

8 Claims, 2 Drawing Sheets

METHOD AND DEVICE FOR CONTROLLING AN INTERNAL COMBUSTION ENGINE

BACKGROUND OF THE INVENTION

1. Field of the Invention

The present invention is directed to a method and a device for controlling a fuel-operated internal combustion engine of a motor vehicle.

2. Description of Related Art

A fuel tank is normally present in motor vehicles for storing the fuel. The fuel tank is equipped with a tank venting system. The tank venting system is used for sealing the tank to prevent fuel or fuel vapors from escaping from the tank in an uncontrolled manner. With the help of a controllable tank venting system, a tank venting valve may be opened and the pressure may be modified in a controlled manner.

U.S. Pat. No. 5,371,412 describes a hybrid vehicle in which an internal combustion engine is started or shut off as a function of the load of the active carbon filter in the tank venting system.

SUMMARY OF THE INVENTION

The present invention is directed to a method and a device for controlling a fuel-operated internal combustion engine of a motor vehicle. A tank venting system associated with the fuel tank is provided in the motor vehicle; it has at least two operating states. Furthermore, the internal combustion engine is automatically shut off according to a shut-off strategy as it is controlled.

The core of the present invention is that the shut-off strategy takes into account the instantaneous operating state of the tank venting system, and means are provided with the help of which the shut-off strategy takes into account the instantaneous operating state of the tank venting system.

The present invention has the advantage that after the internal combustion engine is shut off as determined by the shut-off strategy, a reliable start operation of the internal combustion engine is ensured. In particular, in known hybrid vehicles, which, in addition to an internal combustion engine also have an electric motor for propulsion, or in so-called start/stop controls of the internal combustion engine, the internal combustion engine is shut off as intended, during the operation of the vehicle. This takes place, for example, in idling of the internal combustion engine, while the vehicle is at a traffic light in a waiting phase. The present invention ensures a reliable restart of the internal combustion engine after such a shut-off. This has the following technical background:

In restarting the internal combustion engine, the tank venting valve is normally first closed before a normal tank venting phase starts. However, if the valve cannot be closed, the internal combustion engine sometimes cannot be restarted because the unclosed valve results in a high concentration of fuel vapors in the intake area of the internal combustion engine. The hydrocarbon load of the active carbon filter flows unimpeded to the internal combustion engine in this case. If this concentration exceeds a threshold value, the internal combustion engine may no longer be started, since the fuel/air mixture is too rich.

This is critical in particular in hybrid vehicles or in vehicles having a start/stop control of the internal combustion engine because in that case a start operation at a traffic light or rapidly driving off at a crossing may not be accomplished or may only be accomplished to a limited extent. The present invention thus contributes to a reliable operation of the motor vehicle overall.

The measures recited in the dependent claims make advantageous improvements on and refinements of the device described in the independent claim possible.

In one advantageous embodiment of the present invention, it is provided that at least one first state of the operating states represents a regular state of the tank venting system and at least one second state represents a defective state of the tank venting system. A regular state of the tank venting system may be present when a controller is capable of opening and closing the tank venting valve as desired. A defective state of the tank venting system may be present when a desired opening and closing of the tank venting valve is not possible. The shut-off strategy may ensure the reliable operation of the vehicle as a function of the instantaneous operating state.

In one further advantageous embodiment of the present invention it is provided that the tank venting system has at least one tank venting valve and/or one controller of the tank venting valve. In order to ensure reliable operation and rapid troubleshooting, it is convenient to consider the tank venting system as a system made up of a plurality of components. An extension of the monitoring function to individual components of the system makes it possible to adapt the shut-off strategy more specifically to the different operating states of the tank venting system.

In one further advantageous embodiment of the present invention it is provided that the shut-off strategy takes into account operating states and/or driving states of the motor vehicle. Thus, for example, a charging state of a battery may represent an operating state of a hybrid vehicle. At a low charging state of the battery, the shut-off strategy of the internal combustion engine should be implemented much more restrictively than at a higher charging state. In contrast, a driving state might represent the operation of the vehicle in idling, the overrun operation, or the stopped phase of a vehicle having automatic start/stop. In these driving states, the internal combustion engine may be shut off as long as no other systems require further operation.

In one further advantageous embodiment of the present invention it is provided that, in the case of a tank venting system recognized as defective, the shut-off strategy does not shut off the internal combustion engine or shuts it off with a delay. As mentioned previously, the start response of an internal combustion engine may be negatively affected as a result of a defective tank venting valve. Therefore, if a defective tank venting valve is recognized, the internal combustion engine is no longer shut off or is shut off much more restrictively in order to ensure reliable operation.

In one further particularly advantageous embodiment of the present invention it is provided that the tank venting system is recognized as defective at least when the tank venting valve cannot be closed and/or its control does not allow the valve to be closed. This may result, as described previously, in a high concentration of fuel vapors in the intake area of the internal combustion engine and thus in start problems.

In one further advantageous embodiment of the present invention it is provided that, for determining the operating state of the tank venting system, a response of an engine controller is used, in particular a result of a tank leak diagnosis and/or a result of the idling control and/or lambda control by opening the tank venting valve. With the aid of these diagnostic options, a tank venting valve that is no longer able to close may be reliably recognized. The shut-off strategy may thus be reasonably adapted as needed.

DETAILED DESCRIPTION OF THE INVENTION

Figure 1:
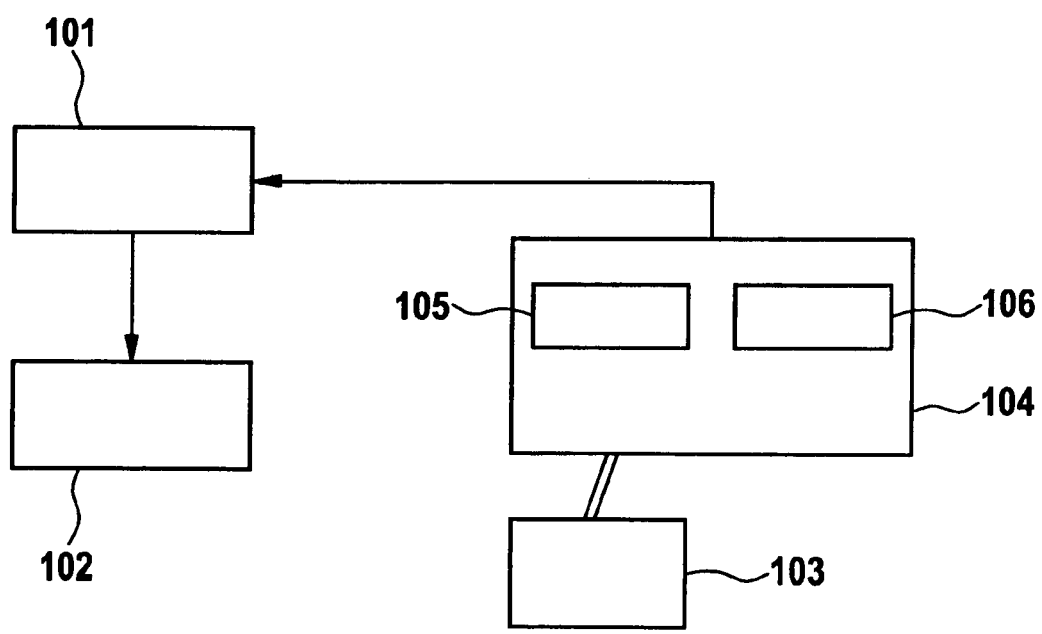
FIG. 1 shows a device for controlling an internal combustion engine.

FIG. 1 shows a device for controlling an internal combustion engine. An internal combustion engine (102) is controlled using means (101). A fuel tank (103), which is equipped with a tank venting system (104), is associated with the internal combustion engine. The tank venting system (104) has the tank venting valve (105) and the controller (106) for the tank venting valve (105). The operating state of the tank venting system is transmitted to the means (101) as an input variable.

Figure 2:
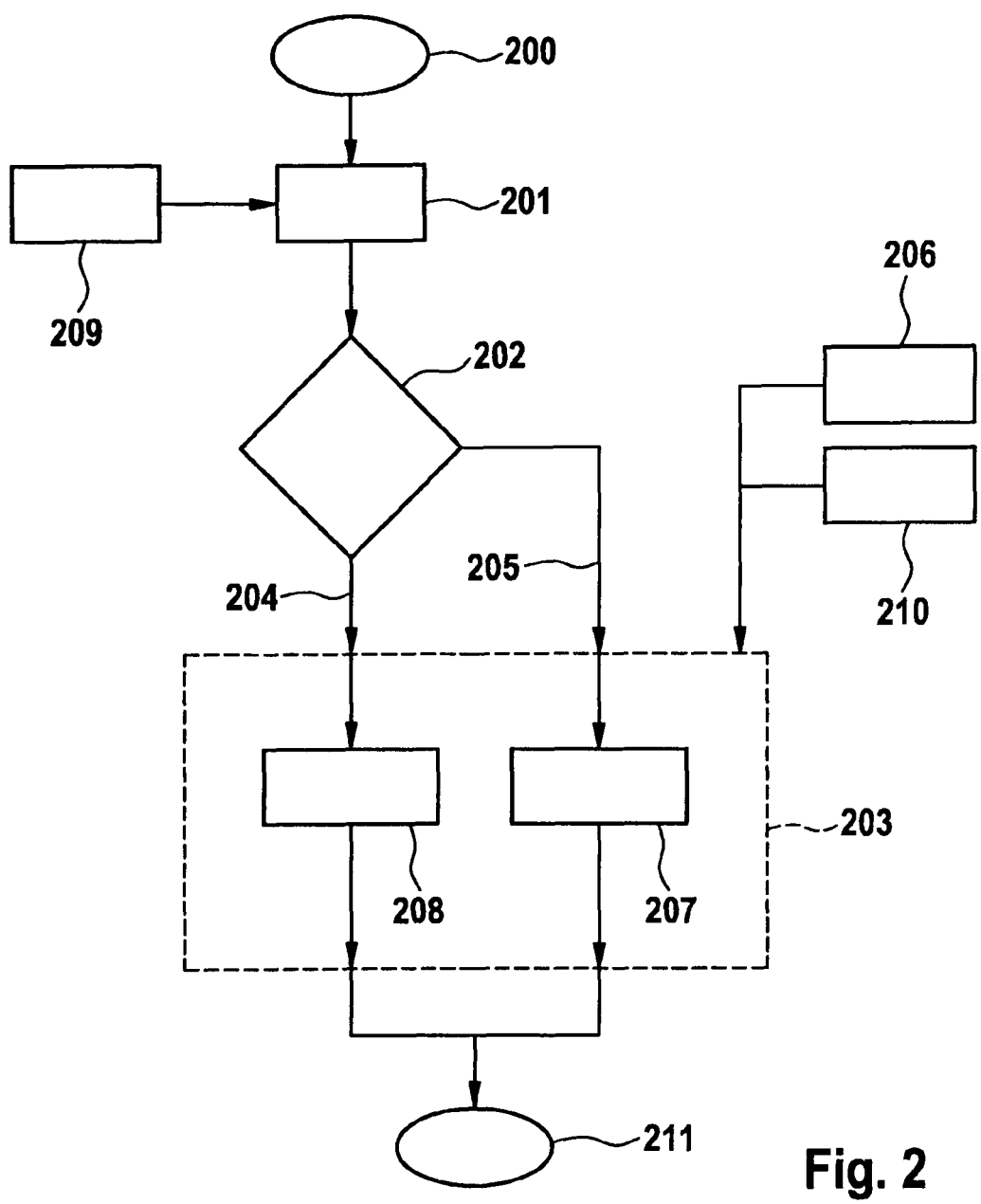
FIG. 2 shows a method for controlling an internal combustion engine.

FIG. 2 shows a method for controlling an internal combustion engine.

Block (200) identifies the start of the method; block (211) identifies the end of the method. The operating state of the tank venting system is diagnosed in block (209).

As mentioned previously, a tank leak diagnosis may be performed and evaluated for determining the operating state of the tank venting system. However, the operating state of the tank venting system may also be inferred from the control response of the idling control or lambda control after the tank venting valve is opened.

The instantaneous operating state of the tank venting system is input in block (201). Query (202) checks whether the instantaneous operating state of the tank venting system is correct (204) or defective (205). A correct state of the tank venting system may be present when a controller is capable of opening and closing the tank venting valve as desired. A defective state of the tank venting system may be present when a desired opening and closing of the tank venting valve is not possible. Thus, a jammed valve may no longer be controlled as desired. It may jam in the closed state, in which case controlled venting of the tank is no longer possible. However, it may also jam in a partially to fully opened state. In this case fuel vapors escape from the tank in an uncontrolled manner. The environment is thus polluted and the capability of the internal combustion engine to function and to start is sometimes impaired or even impeded.

The output signal of the query block (202) is the input signal of the shut-off strategy (203). Depending on the operating state, a normal shut-off strategy (208) or a modified shut-off strategy (207) is carried out.

The normal shut-off strategy shuts off the internal combustion engine according to a shut-off command, for example, on the basis of the idling mode of the internal combustion engine. In the modified shut-off strategy, the internal combustion engine is further operated initially or for an extended period if it is also recognized in the query block that the tank venting system operates erroneously, and restart after shutting off the internal combustion engine may not be ensured.

Further input variables of shut-off strategy (207) include operating states (206) and driving states (210) of the vehicle. As mentioned previously, this is, for example, a charging state of a battery of a hybrid vehicle or the idling operation, the overrun operation, or the stop phase of a vehicle having automatic start/stop.

The above steps may be cyclically repeated and processed.

What is claimed is:

1. A method for controlling a fuel-operated internal combustion engine of a motor vehicle, comprising:
   a tank venting system associated with a fuel tank and having at least two operating states, in which the internal combustion engine is shut off automatically according to a shut-off strategy,
   wherein the shut-off strategy takes into account the instantaneous operating state of the tank venting system,
   wherein at least one first state of the operating states represents a correct state of the tank venting system and at least one second state represents a defective state of the tank venting system;
   wherein the shut-off strategy is configured in such a way that in the case of a tank venting system recognized as defective, the internal combustion engine is not shut off or is shut off with a delay; and
   wherein the tank venting system is recognized as defective at least when the tank venting valve cannot be closed and/or its controller does not allow the valve to be closed.

2. The method as recited in claim 1, wherein the tank venting system has at least one tank venting valve or one controller of the tank venting valve.

3. The method as recited in claim 1, wherein the shut-off strategy takes into account at least one of the operating states and driving states of the motor vehicle, and wherein:
   the operating state is represented by a charging state of at least one electric energy storage device, or
   the driving state is represented at least by the vehicle being in a mode in which the internal combustion engine is shut off at least from time to time.

4. The method as recited in claim 2, wherein the shut-off strategy takes into account at least one of the operating states and driving states of the motor vehicle, and wherein:
   the operating state is represented by a charging state of at least one electric energy storage device, or
   the driving state is represented at least by the vehicle being in a mode in which the internal combustion engine is shut off at least from time to time.

5. The method as recited in claim 1, wherein the operating state of the tank venting system is determined from a response of an engine controller selected from the group consisting of a result of a tank leak diagnosis, a result of a certain response of the idling control and lambda control by opening the tank venting valve.

6. The method as recited in claim 2, wherein the operating state of the tank venting system is determined from a response of an engine controller selected from the group consisting of a result of a tank leak diagnosis, a result of a certain response of the idling control and lambda control by opening the tank venting valve.

7. The method as recited in claim 1, wherein:
   when the instantaneous operating state of the tank venting system represents an error-free state, the shut-off strategy is configured in such a way that during idling or during overrun operation the internal combustion engine is shut off according to predefinable conditions, and
   when the instantaneous operating state of the tank venting system represents a defective state, the shut-off strategy is configured in such a way that during idling or during overrun operation, the internal combustion engine is not shut off or is shut off with a delay according to predefinable conditions.

8. A device for controlling a fuel-operated internal combustion engine of a motor vehicle, comprising:

a tank venting system associated with a fuel tank and having at least two operating states, and means for shutting off the internal combustion engine automatically according to a shut-off strategy, wherein the means for shutting off are configured in such a way that the shut-off strategy takes into account the instantaneous operating state of the tank venting system, wherein at least one first state of the operating states represents a correct state of the tank venting system and at least one second state represents a defective state of the tank venting system;

wherein the shut-off strategy is configured in such a way that in the case of a tank venting system recognized as defective, the internal combustion engine is not shut off or is shut off with a delay; and wherein the tank venting system is recognized as defective at least when the tank venting valve cannot be closed and/or its controller does not allow the valve to be closed.

* * * * *